(12) United States Patent
Lennox et al.

(10) Patent No.: US 10,403,923 B1
(45) Date of Patent: Sep. 3, 2019

(54) BATTERY HAVING A FOLDED ARCHITECTURE

(71) Applicant: SimpliPhi Power, Incorporated, Ojai, CA (US)

(72) Inventors: Stuart B. Lennox, Ojai, CA (US); Timothy M. Bowhall, Sr., Ojai, CA (US); Benjamin H. Widmer, Ojai, CA (US)

(73) Assignee: SimpliPhi Power, Incorporated, Ojai, CA (US)

( * ) Notice: Subject to any disclaimer, the term of this patent is extended or adjusted under 35 U.S.C. 154(b) by 69 days.

(21) Appl. No.: 15/137,260

(22) Filed: Apr. 25, 2016

Related U.S. Application Data

(60) Provisional application No. 62/306,849, filed on Mar. 11, 2016.

(51) Int. Cl.
*H01M 6/46* (2006.01)
*H01M 10/04* (2006.01)
*H01M 10/0525* (2010.01)
*H01M 2/20* (2006.01)
*H01M 10/42* (2006.01)

(52) U.S. Cl.
CPC ........... *H01M 10/04* (2013.01); *H01M 2/202* (2013.01); *H01M 10/0525* (2013.01); *H01M 10/425* (2013.01)

(58) Field of Classification Search
None
See application file for complete search history.

(56) References Cited

U.S. PATENT DOCUMENTS

| | | | |
|---|---|---|---|
| 8,765,283 B2 * | 7/2014 | Um | H01M 2/22 429/121 |
| 9,147,875 B1 | 9/2015 | Coakley et al. | |
| 9,545,010 B2 | 1/2017 | Coakley et al. | |
| 2012/0328914 A1 * | 12/2012 | Wu | H01M 2/202 429/61 |
| 2013/0241498 A1 | 9/2013 | Koebler | |
| 2015/0145482 A1 * | 5/2015 | Hurng | H01M 2/1022 320/134 |
| 2017/0077487 A1 | 3/2017 | Coakley et al. | |
| 2017/0104350 A1 | 4/2017 | Luerkens et al. | |

\* cited by examiner

*Primary Examiner* — Cynthia H Kelly
*Assistant Examiner* — Julian Anthony

(57) ABSTRACT

This disclosure is directed to a battery having a folded architecture that has one or more blocks of cells folded onto one another.

13 Claims, 5 Drawing Sheets

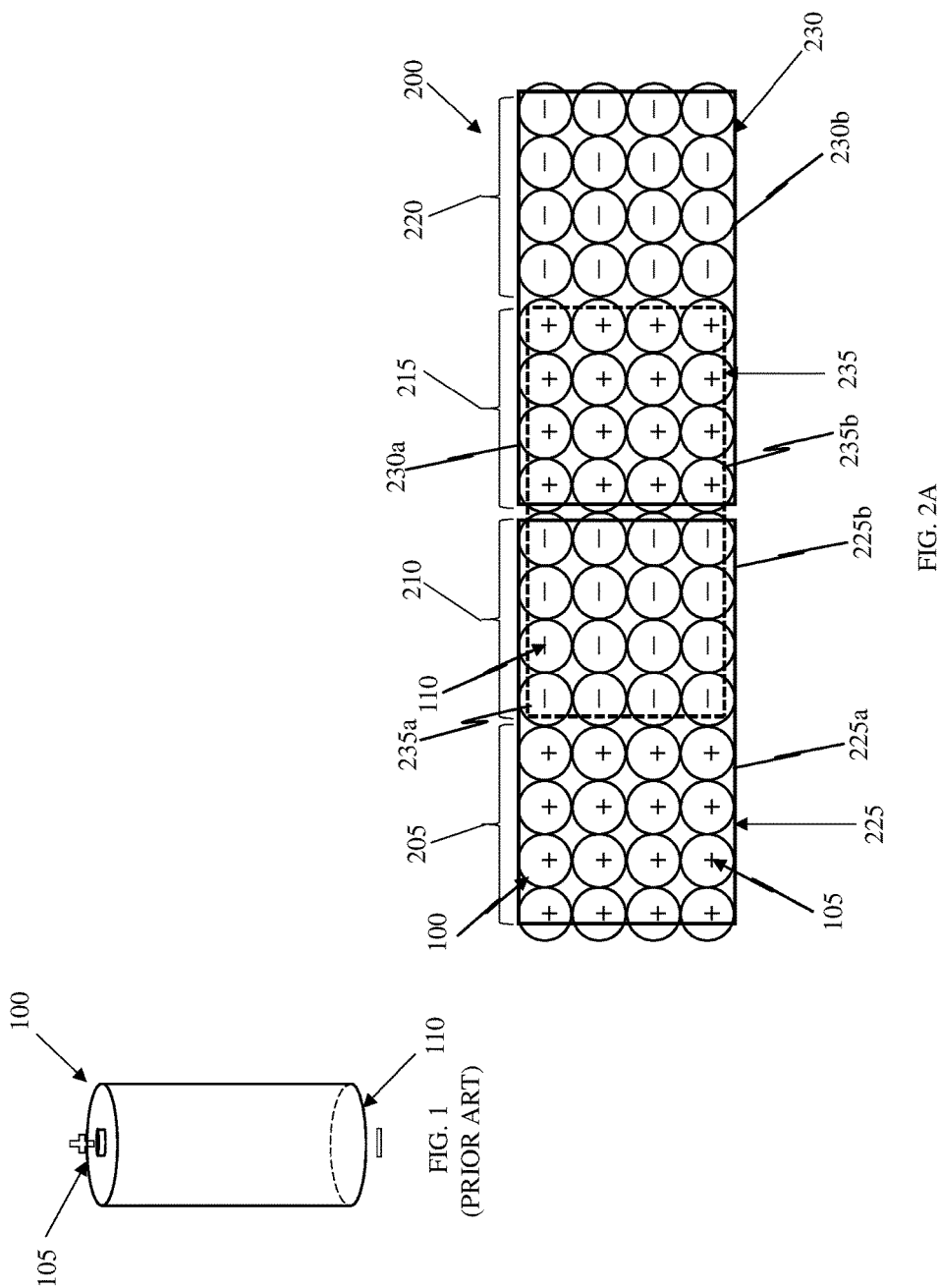

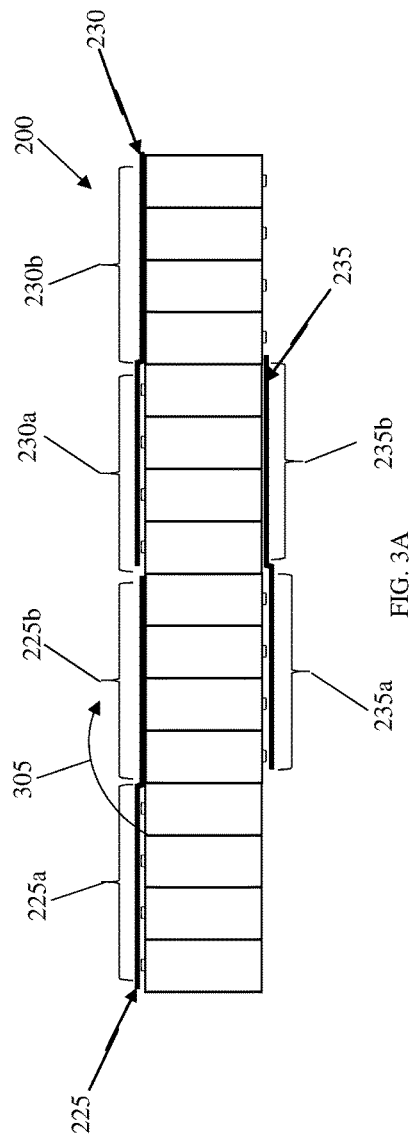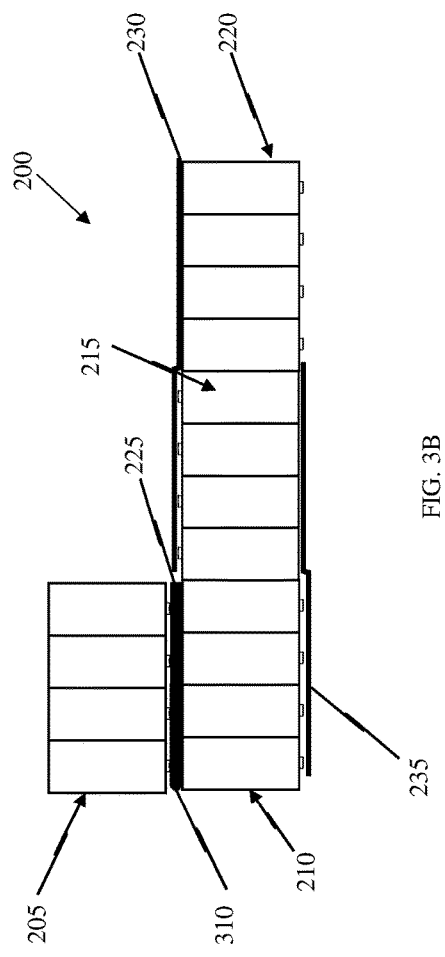
FIG. 3A
FIG. 3B

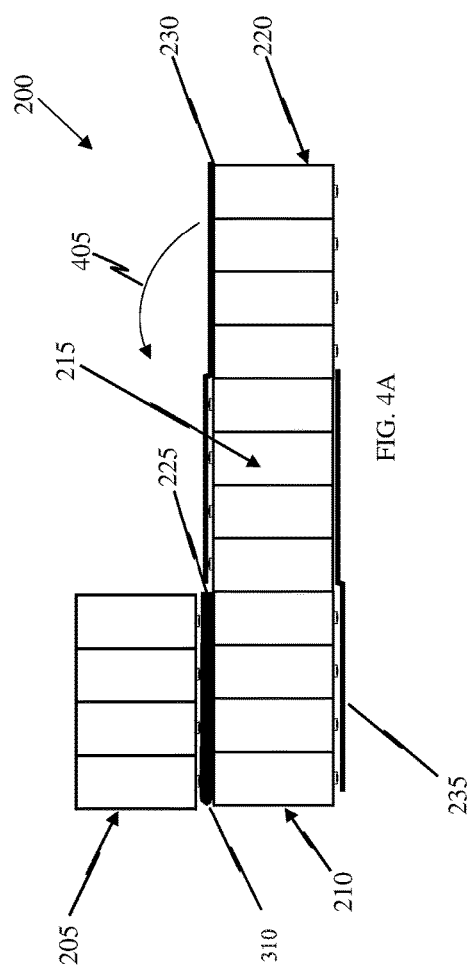
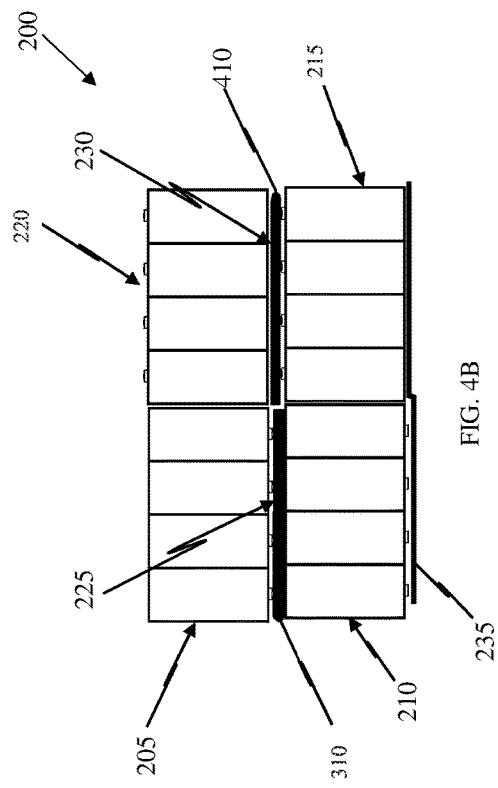
FIG. 4A
FIG. 4B

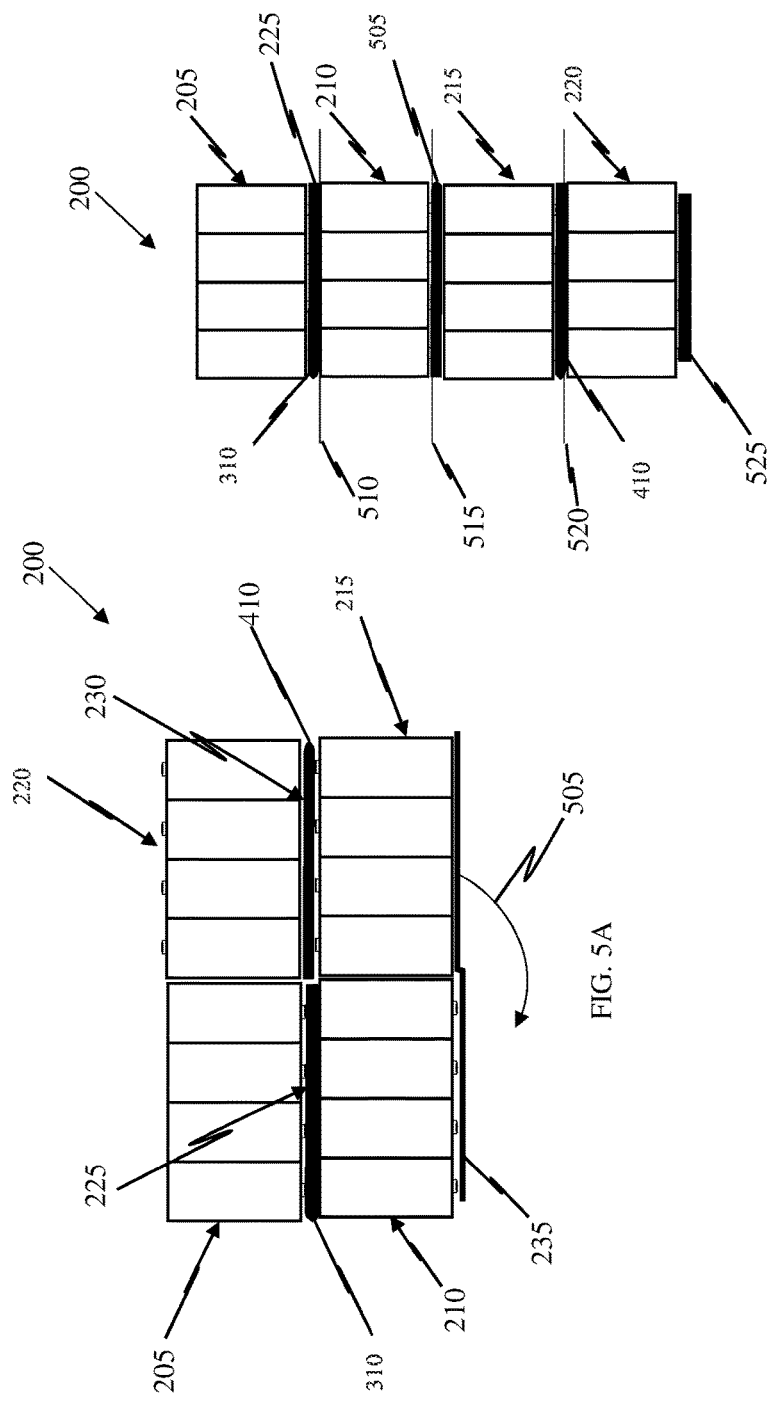

BATTERY HAVING A FOLDED ARCHITECTURE

CROSS-REFERENCE TO RELATED APPLICATION

This application claims the benefit of U.S. Provisional Application Ser. No. 62/306,849, filed by Lennox, et al., on Mar. 11, 2016, entitled "Folded Battery Architecture and Method of Manufacture Therefor," commonly assigned with this application and incorporated herein by reference.

TECHNICAL FIELD

This application is directed, in general, to electrical batteries and, more specifically, to electrical batteries having a folded internal mechanical architecture and methods of manufacturing the same.

BACKGROUND

Electrical cells are energy storage devices designed to receive electrical charge from a source, store the charge for some, often extended, period of time and then deliver the charge to a load to power it. Electrical batteries are groups of electrical cells coupled in parallel and/or series to provide a desired amount of electrical charge at a desired current and voltage.

Electrical cells are distinguished from other types of energy storage devices in that they employ chemical potential to store the electrical charge. Popular cell (battery) chemistries today include lead acid, alkaline, nickel cadmium, nickel metal hydride, lithium polymer, lithium ion and lithium phosphate. Lithium ferrophosphate is a particular kind of lithium phosphate.

Batteries are typically manufactured in several steps. First, cells are inspected and sorted to winnow out defective or undesirable cells. Next, the cells are grouped, and metal interconnections are made to connect the opposing terminals of each a group of cells electrically in parallel to form a battery subassembly. Further metal interconnections are then made to connect multiple battery subassemblies electrically in series to form the battery.

More sophisticated batteries are provided with a battery management system (BMS). BMSs are generally configured to control battery charging and discharging and monitor battery parameters to detect or predict conditions that may cause harm to the battery or battery aging. If a BMS is provided, its various sensing leads are coupled to the interconnections. Thereafter, the battery, together with its BMS, is placed in a suitable battery case and terminal connections made.

SUMMARY

In one embodiment, this disclosure provides a folded battery. The folded battery comprises a first block of cells, wherein each cell of the first block has an anode end and a cathode end, and each of the anode ends of the first block is oriented along a first plane. The folded battery further comprises a second block of cells, wherein each cell of the second block has an anode end and a cathode end. Each of the cathode ends of the second block is oriented along the first plane. The anode ends of the first block are located adjacent the cathode ends of said second block along the first plane. A first conductive plate is located between the first and second blocks and has a first section that contacts each anode end of the first block. The first conductive plate further has a second section that contacts each cathode end of the second block. The first and second sections are joined together at a bend in the first conductive plate and contact each other to provide a conductive path between the first and second blocks. In one embodiment, the first conductive plate comprises at least 95% nickel. In another aspect, the cells of first and second blocks are comprised of lithium ferrophosphate. The cells may have a cylindrical shape, where the anode end is located on one end of cylindrical shape and the cathode end is located on an opposing end of the cylindrical shape.

In another embodiment, the folded battery may further comprises a third block of cells, wherein each cell of the third block has an anode end and a cathode end, and each of the anode ends of the third block is oriented along a second plane parallel to the first plane. The anode ends of the second block is located adjacent the cathode ends of the third block along the second plane. A second conductive plate is located between the second and third blocks and has a first section that contacts each anode end of the second block and a second section that contacts each cathode end of the third block. The first and second sections are joined together at a bend in the second conductive plate and contact each other to provide a conductive path between the second and third blocks. In one aspect of this embodiment, the second conductive plate comprises at least 95% nickel. In another aspect of this embodiment, the folded battery further comprises a fourth block of cells. Each cell of the fourth block has an anode end and a cathode end. Each anode end of said fourth block is oriented along a third plane parallel to the first and second planes. The anode ends of the third block is located adjacent the cathode ends of the fourth block along the third plane. A third conductive plate is located between the third and fourth blocks. A first section of the third conductive plate contact each anode end of the third block, and a second section of the conductive plate contacts each cathode end of the fourth block. The first and second sections are joined together at a bend in the third conductive plate and contact each other to provide a conductive path between the third and second blocks. In one embodiment, the third conductive plate comprises at least 95% nickel.

In another embodiment, the folded battery comprises a battery management system (BMS) coupled to the folded battery.

In yet another embodiment, at least a portion of the cells of the first and second blocks are bound together.

BRIEF DESCRIPTION

Reference is now made to the following descriptions taken in conjunction with the accompanying drawings, in which:

FIG. 1 illustrates a conventional battery cell that can be used to construct a battery cell block used in an embodiment of the folded battery, as provided here;

FIG. 2A illustrates one embodiment of a group of cell blocks wherein the cells are connected by conductive plates;

FIG. 3A illustrates a side view of the embodiment illustrated in FIGS. 2A and 2B in an unfolded state;

FIG. 3B illustrates the embodiment of FIG. 3A after one of the opposing blocks is folded unto an adjacent cell block;

FIG. 4A illustrates a side view of the embodiment illustrated in FIG. 3C is a first folded state and prior to a subsequent folded state;

FIG. 4B illustrates the embodiment of FIG. 4A in a subsequent folded state;

FIG. 5A illustrates the embodiment of FIG. 4C prior to a subsequent folded state; and FIG. 5B illustrates the embodiment of FIG. 5B illustrates the embodiment of FIG. 5A in a subsequent folded state.

DETAILED DESCRIPTION

Figure 2B:
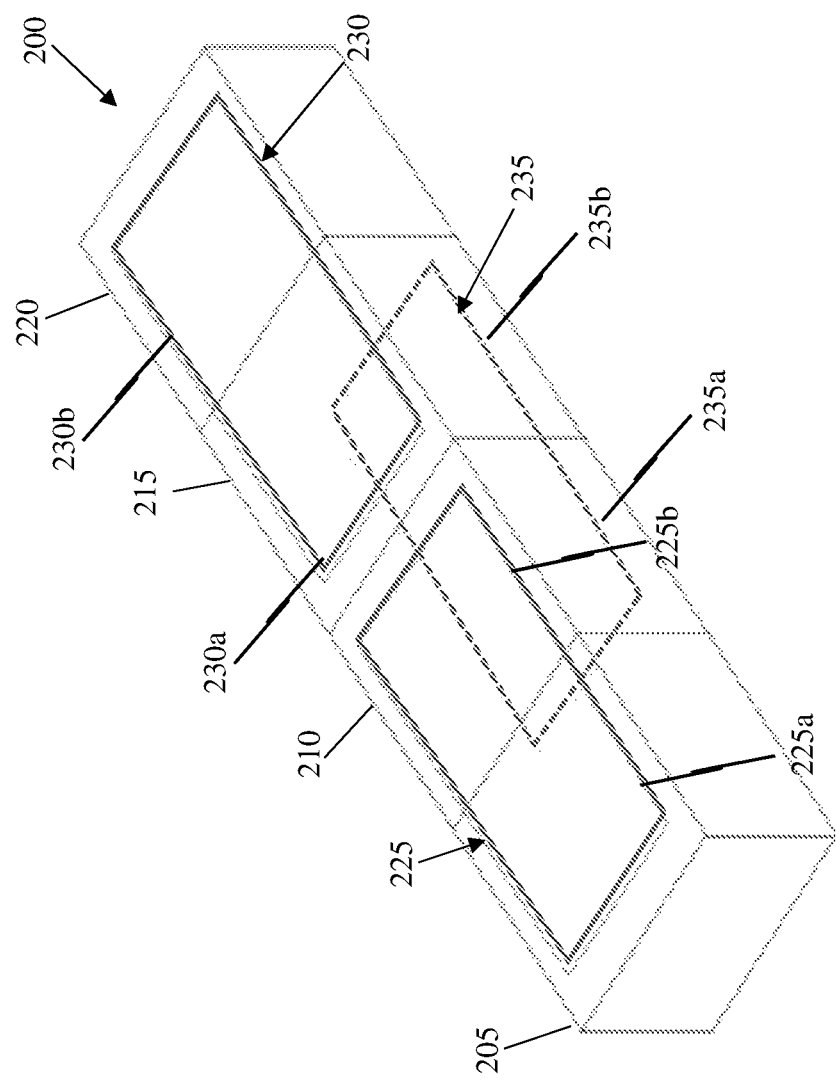
FIG. 2B illustrates a perspective view of FIG. 2A further showing another conductive plate located on an opposing side of the cell blocks.

As described above, cells are grouped, and metal interconnections are made to connect the opposing terminals of each group of cells electrically in parallel to form a battery block or subassembly. Further metal interconnections are then made to connect multiple battery blocks or subassemblies electrically in series to form the folded battery. It is realized herein that, while this manufacturing process yields a functional battery, the process could benefit from simplification, namely reducing the overall number of steps required. More specifically, it is realized herein that it is not necessary to form the further metal interconnections to couple the separate battery blocks electrically in series to form the folded battery. More specifically, it is realized herein that the folded battery blocks may be formed together, such that the further metal interconnections referred to above do not have to be made. It is further realized herein that the folded battery blocks may then be folded to reduce the major dimension of the folded battery (the dimension of the battery that is the longest, be it length, width or height).

Introduced herein are various embodiments of a folded battery having a folded internal mechanical architecture and various embodiments of a method of manufacture thereof. In the various embodiments, cells are coupled in parallel and series using as the conductive plates that span at least two subassemblies, or blocks, of cells. The conductive plates are then folded to cause the blocks to stack upon one another, allowing the folded battery to be inserted into a battery case.

FIG. 1 illustrates a conventional, individual, self-contained (i.e., the cell itself is a packaged battery) cell 100 that may be used in the construction of the embodiments of the folded battery set forth herein. Various types of such cells 100 are known and some have environmental advantages over others, while delivering adequate electrical current for the intended application. While any self-contained conventional energy cell may be used, a preferred cell 100 comprises lithium ferrophosphate (LFP), also often referred to as lithium iron phosphate. Lithium ferrophosphate cells are particularly advantageous, because they can be recycled and have little impact on the environment, as opposed to cobalt-based lithium cell. While not limited to any particular geometry, in one embodiment, the cell 100 has a cylindrical shape, as shown, and has an anode (positive) end 105 and a cathode (negative) end 110 on an opposing ends of the cell 100, as generally shown. Any number of these cells 100 may be electrically connected together to form a folded battery, as discussed below. The number of cells 100 used to construct the different embodiments of folded battery, as described herein, may vary, depending on the design.

FIG. 2A illustrates an embodiment of a folded battery 200 at one stage of fabrication and in an unfolded state. The folded battery 200 comprises multiple blocks of cells 205, 210, 215 and 220 (hereinafter referred to as block or blocks). The individual cells 100 may be bound together by glue or insulative strapping, or other mechanical means, known to those skilled in the art to form blocks 205, 210, 214, and 220.

However, in a preferred embodiment, the cells are glued together. This provides a quick and easy way to bind the cells 100 together. As seen in FIG. 2A, the individual cells 100 have been positioned adjacent or near each other and bound together. In other words, they are positioned such that the blocks 205, 210, 215, and 220 can be folded onto one another after being joined together by conductive plates 225, 230, 235, as discussed below. In some embodiments, the blocks 205, 210, 215, and 220 may sequentially touch each other, as shown, or in other embodiments, the blocks may be separated by a distance ranging from about 0.0625 inches to about 1.0 inches. It should be noted, that these values serve as examples only, and that other distances that would be governed by design constraints, as known to those skilled in the art, given this disclosure, are within the scope of this disclosure. Though four blocks 205, 210, 215, and 220 are shown, in other embodiments, the folded battery 200 may comprise two or more blocks, depending on the intended power storage or use requirements. As seen in the embodiment of FIG. 2A, the anode ends 105 of the cells 100 of block 205 are all oriented along the same plane, while the cathode ends 110 of the respective cells 100 of block 210 are oriented along the same plane as the anode ends 105 of block 205. This configuration is repeatable for blocks 215 and 220. As seen from this embodiment, this scheme may be repeated to encompass any number of blocks to meet larger power requirements.

As seen in the embodiment of FIG. 2A, a first section 225a of conductive plate 225 contacts each anode end 105 of each of the cells 100 in block 205, and a second section 225b of the conductive plater 225 contacts each cathode end 110 of the cells 100 in block 210. Similarly, a first section 230a of conductive plate 230 contacts each anode end 105 of each of the cells 100 in block 215, and a second section 230b of conductive plate 230 contacts each cathode end 110 of the cells 100 in block 210. On the opposite side of the folded battery 200, in initial stages of fabrication, a first section 235a of conductive plate 235 contacts each cathode end 110 of the cells of block 210, and a second section 235b of conductive plate 235 contacts each anode end 105 of the cells of block 215. This conductive plate positioning uniquely allows the blocks 205, 210, 215 and 220 to be folded with respect to one another in the manner described below. In a preferred embodiment, the conductive plates 225, 230, and 235 are a continuous conductive sheet, because it reduces manufacturing time and costs. However, in other embodiments, the conductive plates 225, 230, and 235 may have a criss-cross, such as a basket weave, configuration formed from a single sheet of conductive material, or it may be comprised of individual strips that are electrically connected together in a similar configuration. However, it has been found herein that folded continuous metal plates or sheets simultaneously act as a good electrical conductor and thermal dissipater with respect to the flow of electrons throughout a battery having many, perhaps hundreds, of cells.

As used herein and in the claims, "contact or contacting" means directly touching the recited surface, or touching a conductive surface, which may comprise one or more layers, that in turn touches the recited surface to provide a conductive path between the conductive plate and the recited surface. For example, a conductive adhesive or paste may be located between the cell's anode end 105 or cathode end 110 and the conductive plate 225, 230, or 235. In such instances and for purposes of this disclosure, the conductive plate contacts the anode end 105 or cathode end 110. It should be noted, that these examples serve only as examples, and other variations, as governed by design constraints, as known to those skilled in the art, given the disclosure herein, are within the scope of this disclosure.

The conductive plates 225 230, 235 may have the same metal or metal alloy composition or a different composition, provided that, the metal or metal alloy is sufficiently conductive for designed application purposes. In one embodiment, the conductive plates 225, 230, 235 may be comprised of at least 95% nickel. Alternatively, the conductive plates 225, 230, 235 may be comprised of other conductive metals, such as copper, gold or silver. Alternatively, the conductive plates 225, 230, 235 may be comprised of a flexible, highly conductive polymer, such as organic polymers that conduct electricity. Such compounds may have metallic conductivity or can be semiconductors. The thickness of the conductive plates 225, 230, 235, may vary. For example, the conductive plates 225, 230, 235 may have a thickness ranging from about 0.015625 inches to about 0.125 inches. It should be noted, that these examples serve only as examples, and other thicknesses, as governed by design or materials constraints, as known to those skilled in the art and given the disclosure herein, are within the scope of this disclosure.

The conductive plates 225, 230, and 230 are connected to the anode ends and cathode ends as described above. As used herein and in the claims, "connected" means that the recited elements are fixedly attached in a way to provide a conductive path between the recited elements, such as the anode end 105 or cathode end 110 of the cells 100 and the conductive plate 225, 230, or 235. In one advantageous embodiment, the conductive plates 225, 230, 235 are welded to the respective anode ends 105 and cathode ends 110. The conductive plates 225, 230, 235 cause the cells 100 to be coupled in electrical parallel to form the blocks, and further cause the blocks to be coupled in electrical series. As mentioned above, FIG. 2A shows four joined blocks but additional blocks may be included in the same pattern illustrated in FIG. 2A. Once the blocks 205, 210, 215, and 220 are connected together, the folded battery 200 is ready to be folded.

FIG. 2B is a perspective view of the embodiments of FIG. 2A that illustrates the blocks 205, 210, 215, and 220 connected together by conductive plates 225, 230, and 235. As seen here and at this stage of fabrication, conductive plates 225 and 230 are oriented along the same plane, which as illustrated, is the upper surface of the folded battery 200.

FIG. 3A is a side view of the embodiment of FIGS. 2A and 2B showing the folded battery 200 in an unfolded state. FIG. 3B shows the folded battery 200 following a first folding step 305, wherein blocks 205 and 210 are folded together. The folding step 305 forms a bend 310 in the conductive plate 225 along the depth, (into and out of the page) of the blocks 205 and 210. The fold brings the first and second sections 225a, 225b (FIG. 3A) of the conductive plate 225 into contact with each other, which forms a conductive path between blocks 205 and 210. The folding 305 also causes the anode end 105 of block 205 to align with the cathode end 110 of block 210 along the same plane, as shown. Additionally, the folding step 305 also causes the first and second sections 225a and 225b to align along that same plane. In one embodiment, the folding 305 causes block 205 to rotate 180° and move from a position to the left of the block 210 to a position over block 210. The conductive plate 225 attached to blocks 205 and 210 in FIG. 3B bends 180° to accommodate the first fold 305 to arrive at the illustrated embodiment of FIG. 3B.

FIG. 4A is a side view of the embodiment of FIG. 3B just prior to a second folding step 405, wherein blocks 215 and 220 are folded together. The folding step 405 forms a bend 410 in the conductive plate 230 along the depth, (into and out of the page) of blocks 215 and 220. The fold 405 brings the first and second sections 230a, 230b (FIG. 3A) of the conductive plate 230 into contact with each other, which forms a conductive path between blocks 215 and 220. The folding 405 also causes the cathode end 110 of block 220 to align with the anode end 105 of block 215 along the same plane as that of blocks 205 and 210, as shown. However, as discussed below, additional folding steps will further rotate blocks 215 and 220 into a different plane. Additionally, the folding step 405 also causes the first and second sections 225a and 225b to align along that same plane. In one embodiment, the folding causes block 220 to rotate 180° and move from a position to the right of the block 215 to a position over block 215. The conductive plate 230 attached to blocks 215 and 220 in FIG. 4A bends 180° to accommodate the second fold 405 to arrive at the illustrated embodiment of FIG. 4B.

FIG. 5A is a side view of the embodiment of FIG. 4B just prior to a third folding step 505, wherein blocks 215, 220 and 205, 210 are folded together. The folding step 505 forms a bend 510 in the conductive plate 235 along the depth, (into and out of the page) of blocks 205, 210, 215 and 220. The fold 505 brings the first and second sections 235a, 235b (FIG. 3A) of the conductive plate 235 into contact with each other, which forms a conductive path between blocks 210 and 220, and thus a conductive path through the battery 200. In one embodiment, the folding causes blocks 215, 220 to rotate 180° and move from a position to the right of the blocks 205, 210 to a position under blocks 205, 210. The conductive plate 235 attached to blocks 210 and 220 in FIG. 5A bends 180° to accommodate the third fold 505 to arrive at the illustrated embodiment of FIG. 5B.

The resulting folded battery 200, depending on the number of blocks used, has one or more parallel planes along which the anode ends of one block are aligned with the cathode ends of another block. For example, in the illustrated embodiment, the anode ends of the cells of the block 205 and the cathode ends of the cells of block 210 are oriented along a first plane 510. The anode ends of the cells of the block 210 and the cathode ends of the cells of block 215 are oriented along a second plane 515, and the anode ends of the cells of the block 215 and the cathode ends of the cells of block 220 are oriented along a third plane 520. Further, the first, second and third conductive plates 225, 230 and 235 are located between the blocks 205, 210, 215, and 220 and along the respective planes, as shown.

The embodiment of FIG. 5B may further comprise a conventional BMS 525 that is coupled to the folded battery 200. The coupling may be accomplished through conventional means, such as electrically coupling the BMS to the folded battery with hardwire, or by a solder. Alternatively, the coupling may be achieved wirelessly.

As stated above, BMSs are generally configured to control battery charging and discharging and monitor battery parameters to detect or predict conditions that may cause harm to the battery or battery aging. More specifically, various embodiments of BMSs may be configured to control the rate at which a battery is charged to minimize the time required to recharge the battery, maximize the amount of charge stored in the battery, optimize between recharge time and stored charge, charge at some desired rate and/or over some desired time or adjust rates of charge as batteries age and their charge characteristics change. Various embodiments of BMSs may also, or alternatively, be configured to control the rate at which a battery is discharged to maximize the current derived from the battery, maximize the charge derived from the battery over a given charge cycle, limit the rate at which a battery is discharged to maintain a desired terminal voltage or adjust rates of discharge as batteries age and their discharge characteristics change. Various embodiments of BMSs may also or alternatively detect or predict undesirable conditions, such as excessive charge or discharge rates, excessive performance degradation, excessive or insufficient ambient temperature, reverse polarity, thermal runaway or imminent or actual battery failure. Those skilled in the art will understand that a BMS may be used to control the embodiments of the BMS disclosed herein.

Whereas FIGS. 2A and 2B showed blocks 205, 210, 215, and 220 in a planar orientation, FIG. 5B shows blocks 205, 210, 215, and 220 in a horizontal orientation. However, it is still apparent that while blocks 205, 210, 215, and 220 remain connected as before, they no longer have a footprint equal to that of four battery blocks 205, 210, 215, and 220. Instead, FIG. 5B shows battery blocks 205, 210, 215, and 220 to be reoriented into a stack having a footprint that is the same as that of a single block. The stack may be placed in a battery case, coupled to a BMS and terminals (which may take the form of posts that extend from the battery case like a car battery). The case may then be closed and perhaps sealed.

While embodiments have been described having folds that are parallel to one another, other embodiments have folds that are perpendicular to one another and combinations of parallel and perpendicular folds. Those skilled in the art will understand how these other embodiments may be constructed given the teachings herein.

Those skilled in the art to which this application relates will appreciate that other and further additions, deletions, substitutions and modifications may be made to the described embodiments.

What is claimed:

1. A folded battery, comprising:
   a first, second, third, and fourth block of cells, wherein each cell of said first, second, third, and fourth block of cells has an anode end and a cathode end opposite said anode end; and
   a first, second, and third folded conductive plates, where each of said first second, and third folded conductive plates have a first section and a second section, wherein:
      the first section of said first folded conductive plate contacts each anode end of each cell of said first block of cells;
      the second section of said first folded conductive plate contacts each cathode end of each cell of said second block of cells;
      said second section of said first conductive plate is folded back on and in contact with said first section of said first conductive plate along a first plane providing a conductive path between each anode end of each cell of said first block of cells and each cathode end of each cell of said second block of cells;
      the first section of said second conductive plate contacts each anode end of each cell of said second block of cells;
      the second section of said second conductive plate contacts each cathode end of each cell of said third block of cells;
      said second section of said second conductive plate is folded back on and in contact with said first section of said second conductive plate along a second plane substantially parallel to said first plane providing a conductive path between each anode end of each cell of said second block of cells and each cathode end of each cell of said third block of cells;
      the first section of said third conductive plate contacts each anode end of each cell of said third block of cells;
      the second section of said third conductive plate contacts each cathode end of each cell of said fourth block of cells; and
      said second section of said third conductive plate is folded back on and in contact with said first section of said third conductive plate along a third plane substantially parallel to said first plane and said second plane providing a conductive path between each anode end of each cell of said third block of cells and each cathode end of each cell of said fourth block of cells.

2. The folded battery of claim 1, wherein said first, second, and third conductive plates comprise at least 95% nickel.

3. The folded battery of claim 1, wherein said first, second, third, and fourth block of cells are comprised of lithium ferrophosphate.

4. The folded battery of claim 1, wherein each of said cells of said first, second, third, and fourth block of cells are cylindrical in shape.

5. The folded battery of claim 1, wherein a portion of said cells in said first block are bound together.

6. The folded battery of claim 1, wherein a portion of said cells in said second block are bound together.

7. The folded battery of claim 1, wherein a portion of said cells in said third block are bound together.

8. The folded battery of claim 1, wherein a portion of said cells in said fourth block are bound together.

9. The folded battery of claim 1, wherein a footprint of said folded battery is substantially the same size as a footprint of each of said first, second, third, and fourth block of said cells.

10. The folded battery of claim 1, further comprising a battery management system (BMS) coupled to said folded battery.

11. The folded battery of claim 10, wherein said BMS is in contact with each anode end of each cell of said fourth block of cells.

12. The folded battery of claim 1, wherein said folded battery is inserted in a battery case.

13. The folded battery of claim 1, further comprising additional blocks of cells and folded conductive plates, wherein:
   a first section of any of said additional folded conductive plates contacts each anode end of each cell of a previous block of cells;
   a second section of any of said additional folded conductive plates contacts each cathode end of each cell of a next block of said additional blocks of cells; and
   said second section of any of said additional folded conductive plates is folded back on and in contact with said first section of any of said additional folded conductive plates along a plane substantially parallel to said first, second, and third planes providing a conductive path between each anode end of each cell of said previous block of cells and each cathode end of each cell of said next block of cells.

* * * * *